US012420383B1

(12) United States Patent
Munson et al.

(10) Patent No.: US 12,420,383 B1
(45) Date of Patent: Sep. 23, 2025

(54) OFFSET VISE TOOL

(71) Applicants: Mark Dean Munson, Vernon,, TX (US); Darell Shane Hokett, Altus, OK (US)

(72) Inventors: Mark Dean Munson, Vernon,, TX (US); Darell Shane Hokett, Altus, OK (US)

( * ) Notice: Subject to any disclaimer, the term of this patent is extended or adjusted under 35 U.S.C. 154(b) by 0 days.

(21) Appl. No.: 19/009,461

(22) Filed: Jan. 3, 2025

(51) Int. Cl.

| | |
|---|---|
| ***B25B 13/48*** | (2006.01) |
| ***B25B 3/00*** | (2006.01) |
| ***B25B 23/00*** | (2006.01) |
| ***B25B 23/16*** | (2006.01) |

(52) U.S. Cl.
CPC .............. *B25B 13/481* (2013.01); *B25B 3/00* (2013.01); *B25B 23/0021* (2013.01); *B25B 23/16* (2013.01)

(58) Field of Classification Search
CPC .. B25B 5/12; B25B 7/12; B25B 7/123; B25B 13/481; B25B 3/00; B25B 9/00
See application file for complete search history.

(56) References Cited

U.S. PATENT DOCUMENTS 541,294 A * 6/1895 Henry ..................... B26B 13/20 30/261
1,093,726 A * 4/1914 Pearson .................. B26B 13/20 30/257
1,845,798 A * 2/1932 Keiser, Jr. .............. A01G 3/065 30/261
2,945,237 A * 7/1960 Smith ....................... B25B 7/12 72/449
5,058,869 A * 10/1991 Ruthven ................. B25B 7/123 269/45
5,157,996 A * 10/1992 Keyvani ................... B25B 7/06 81/416
5,339,712 A * 8/1994 Keyvani .................. A61C 3/14 606/205
5,499,800 A * 3/1996 Albin ...................... B25B 7/123 81/487
5,718,419 A * 2/1998 Hall ........................ B25B 7/123 269/282
6,019,021 A * 2/2000 Keyvani ................... B25B 9/00 81/416
6,332,274 B1 * 12/2001 Domenge ................. B25B 7/04 81/367
6,389,936 B1 * 5/2002 Domenge ................. B25B 7/04 81/424

(Continued)

FOREIGN PATENT DOCUMENTS

CN 103458807 B 5/2016

*Primary Examiner* — David B. Thomas
(74) *Attorney, Agent, or Firm* — Tomlinson McKinstry, P.C.

(57) ABSTRACT

A vise tool with an offset shaft assembly. The vise tool allows for the turning of hard-to-reach bolts and other items, using a traditional vise grip handle. The handle has a socket having two parts—an inner part which turns an inner shaft and an outer part which turns an outer shaft. The handle, rather than adjusting two jaws, adjusts the position of the inner part and outer part of the sockets. Jaws are located in the same plane as the handle, but offset by the length of the offset shaft. The vise tool locks in place due to an over-center arrangement with a spring, as with standard vise grips. Various lengths of shafts and types of jaws may be used.

9 Claims, 9 Drawing Sheets

(56) References Cited

U.S. PATENT DOCUMENTS

| | | | | |
|---|---|---|---|---|
| 6,487,942 | B1 * | 12/2002 | Carter | B25B 7/02 81/367 |
| 7,156,004 | B1 | 1/2007 | Whitehead et al. | |
| 8,328,170 | B2 * | 12/2012 | Wasinger | B25B 7/123 269/216 |
| 8,397,608 | B1 * | 3/2013 | Dumback | B25B 7/123 81/418 |
| 8,584,335 | B2 * | 11/2013 | Tsang | B25B 7/123 269/95 |
| 9,636,804 | B2 * | 5/2017 | Wu | B25B 7/02 |
| 11,826,888 | B2 | 11/2023 | Solomon | |
| 2006/0142777 | A1 * | 6/2006 | Bastian | A61B 17/158 606/88 |
| 2008/0223184 | A1 * | 9/2008 | Stevens | B25B 7/02 81/319 |

* cited by examiner

OFFSET VISE TOOL

SUMMARY

The present invention is directed to a vise tool. The vise tool comprises a handle assembly, a jaw assembly, and an offsetting shaft assembly. The handle assembly comprises a first handle and a second handle movable relative to the first handle. The jaw assembly comprises a pair of jaws adjustable between a closed and locked position and an open position. The offsetting shaft assembly operatively connects the handle assembly to the jaw assembly, and defines an offset distance between a plane containing the handle assembly and a plane containing the jaw assembly. The handle assembly is configured to open, close, and lock the pair of jaws. The pair of jaws are configured to rotate about a rotational axis parallel to the plane containing the handle assembly.

In another aspect the invention is directed to a vise tool. The vise tool comprises a handle assembly, a jaw assembly, and an offsetting shaft assembly. The handle assembly comprises a first handle and a second handle, where the second handle is movable relative to the first handle. The jaw assembly comprises a pair of jaws configured to grip and lock onto an object and rotate in a first plane. The offsetting shaft assembly operatively connects the handle assembly to the jaw assembly. The offsetting shaft assembly positions the first plane parallel to and offset from a second plane, in which the second plane contains the handle assembly.

BRIEF DESCRIPTION OF THE DRAWINGS

As shown in FIG. 1, the vise tool is closed and locked. The offset shaft assembly is disposed along an axis which is perpendicular to a first plane containing the jaws and a second plane containing the handle assembly, as shown in FIG. 10.

DETAILED DESCRIPTION

Figure 1:
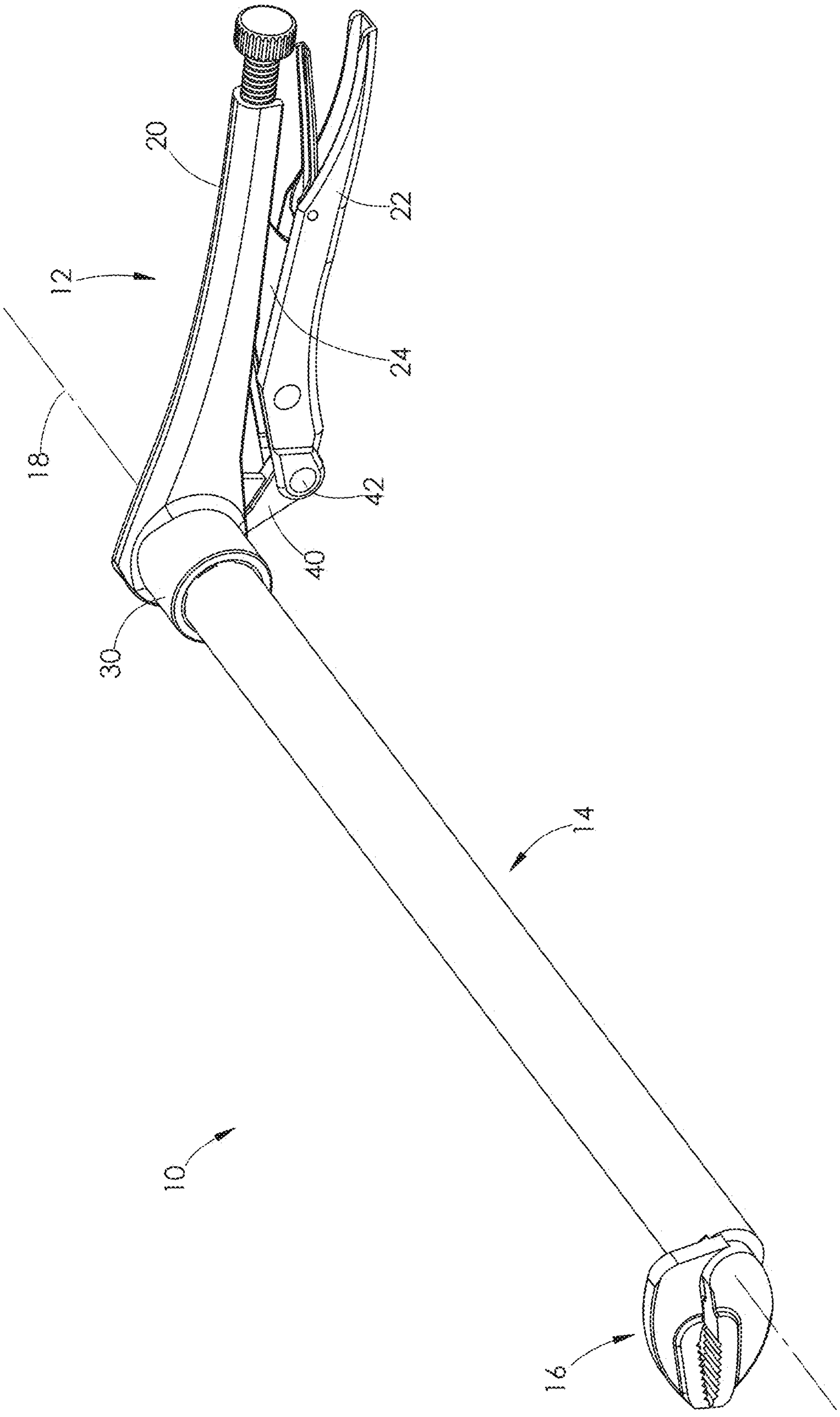
FIG. 1 is a perspective view of the offset vise tool of the current invention.
Figure 2:
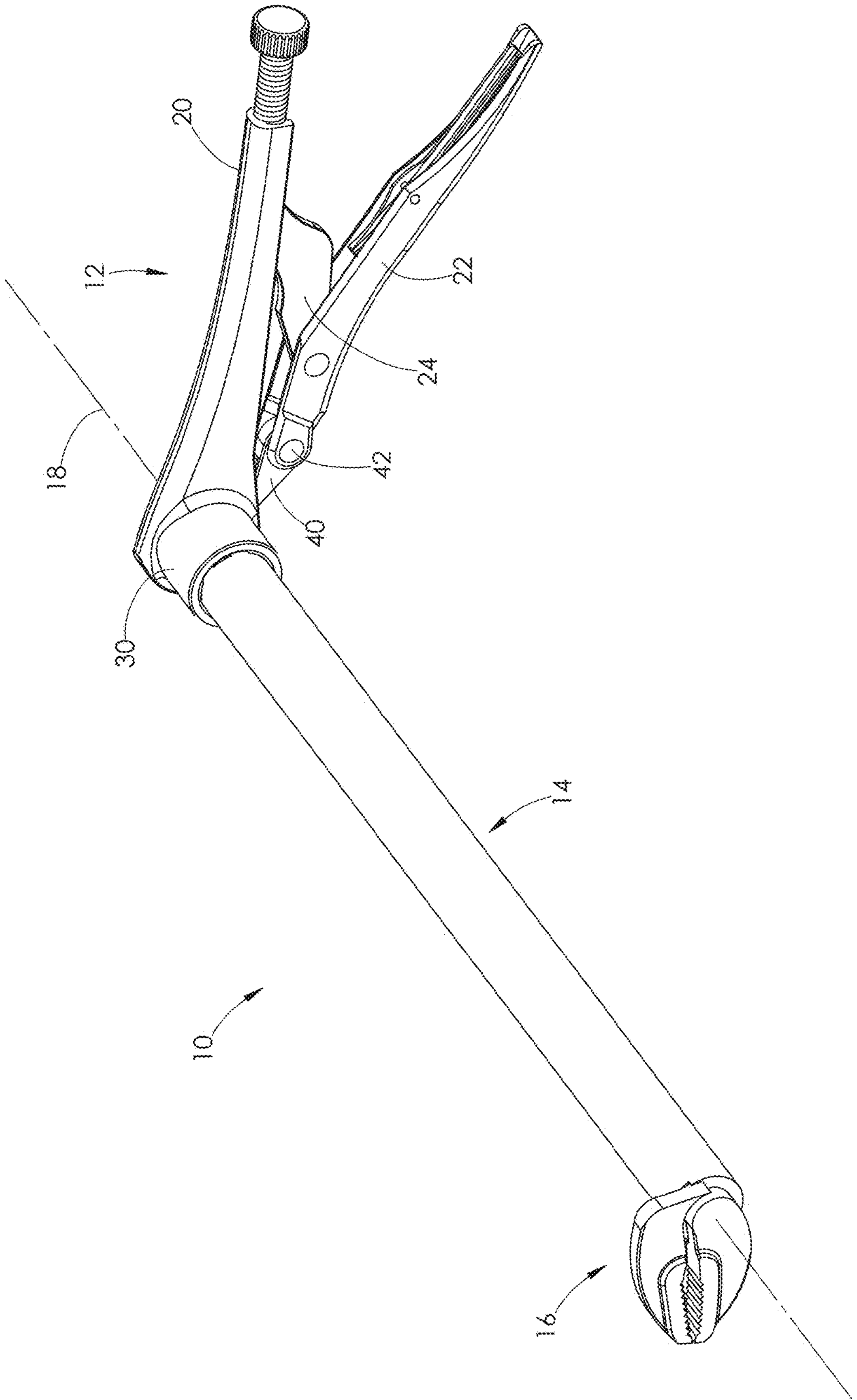
FIG. 2 is the view of FIG. 1, with the jaws in an open position.
Figure 3:
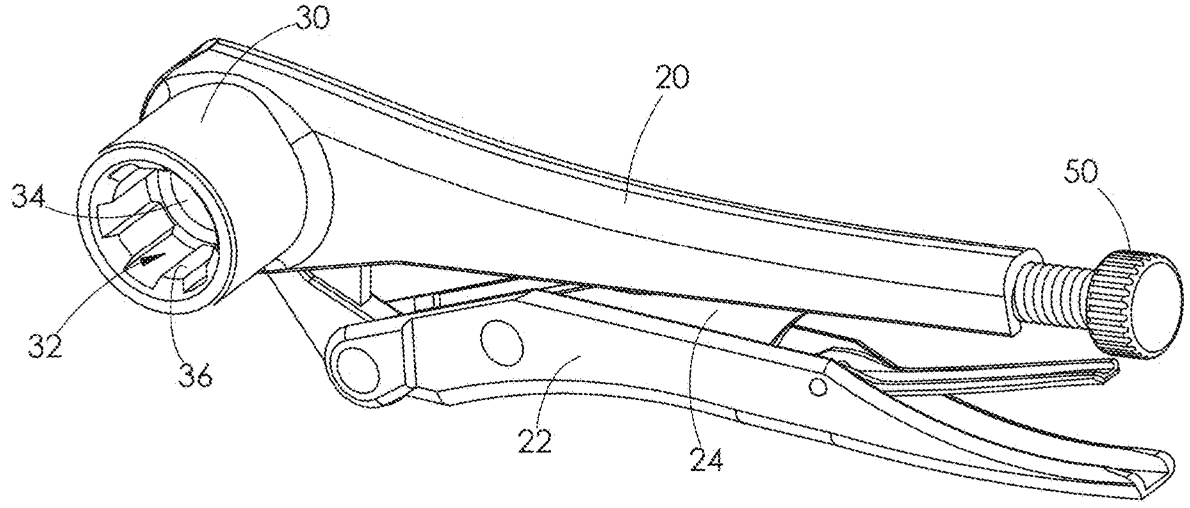
FIG. 3 is a front perspective view of the handle assembly of the vise tool with the offset shaft assembly separated from the socket.
Figure 4:
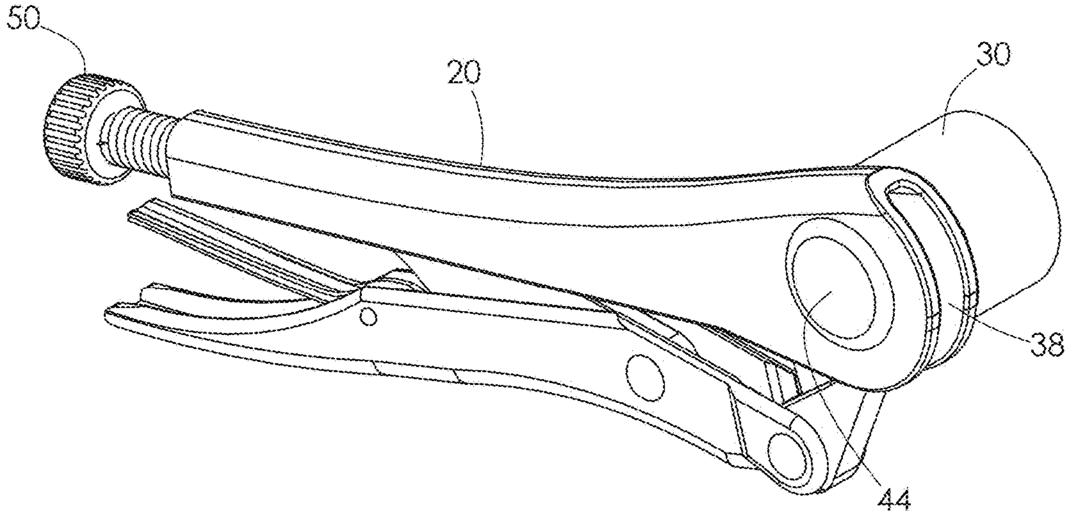
FIG. 4 is a back view of the handle assembly of the vise tool with the offset shaft assembly separated from the socket.
Figure 5:
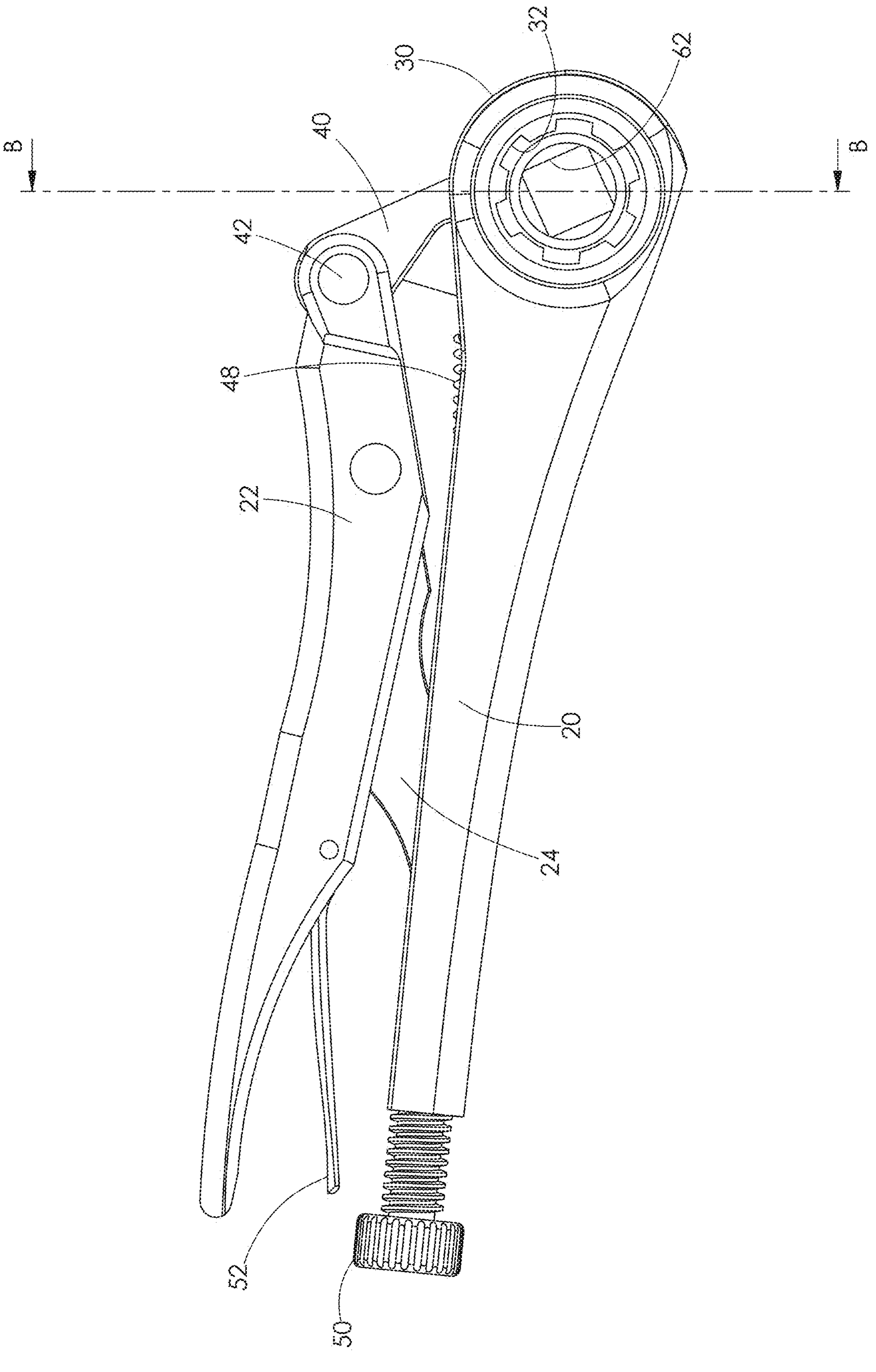
FIG. 5 is a side view of the handle assembly of the vise tool with the offset shaft assembly separated from the socket.
Figure 6:
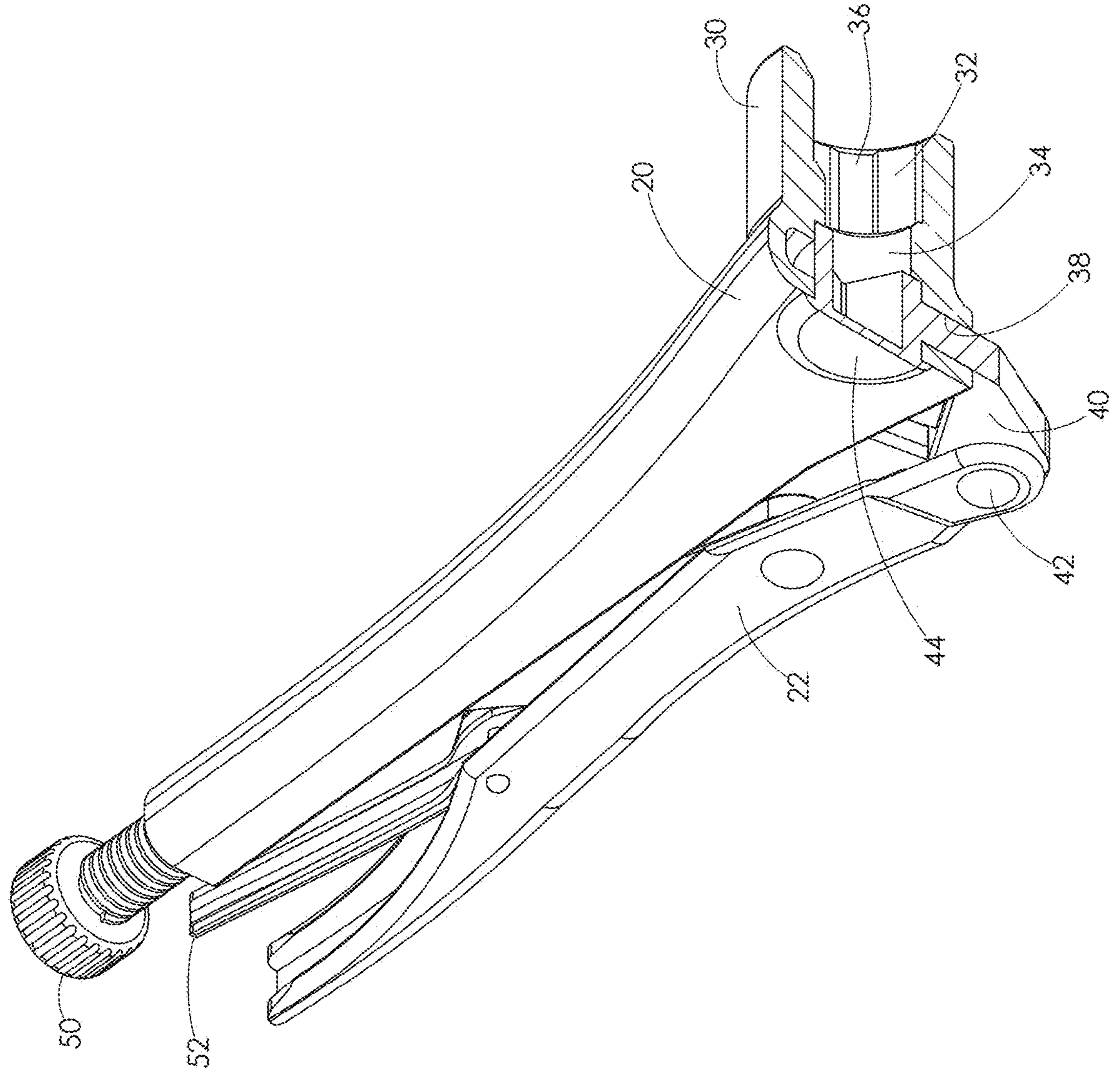
FIG. 6 is a perspective view of the handle assembly with the socket assembly sectioned along line B-B from FIG. 5.

Turning now to the figures, FIGS. 1 and 2 show an offset vise tool 10. The offset vise tool 10 comprises a vise handle 12, an offsetting shaft assembly 14, and a pair of jaws 16. The pair of jaws 16 are adjustable from a closed and locked position, shown in FIG. 1, to an open position, shown in FIG. 2, by operation of the vise handle 12. Operation of the vise tool 10 is familiar to those who use standard vise grips. A user will grip the vise handle 12 to open, close, lock and release the jaws 16, as well as to turn a bolt or other item with the jaws 16 when the jaws are closed and locked. The jaws 16 rotate around an axis of rotation 18 similar to the axis of rotation of a standard set of jaws in a set of vise grips. However, the jaws 16 are offset by a distance defined by a length of the offsetting shaft assembly 14. The jaws 16 rotate in a plane which is parallel to, but offset from, the plane containing the vise handle 12. As shown, FIG. 1 shows the pair of jaws 16 in a closed position, while FIG. 2 shows the pair of jaws 16 in an open position.

The vise handle 12 comprises a fixed handle 20 and a movable handle 22. One should understand that the phrases "fixed" and "movable" are relative to an outer socket 30, and that both handles 20, 22 are capable of movement when held by a user, but that generally, the fixed handle 20 will appear not to move during use, due to it being rotationally fixed to the outer socket 30 and visible portions of the offsetting shaft assembly 14 and one of the jaws 16.

With reference to FIGS. 3-6, the vise handle 12 is shown in more detail. A connecting shaft 24 is pivotally attached to each of the movable 22 and fixed 20 handles. The fixed handle 20 is attached to the outer socket 30. The outer socket 30 comprises an internal profile 32. The movable handle 22 connects to a rotational arm 40 at a first arm pivot 42.

The rotational arm 40 is nested such that its second end 44 is disposed inside a first portion 34 of the outer socket 30. The internal profile 32 of the outer socket 30 has the first portion 34, configured to allow the outer socket 30 and the second end 44 of the rotational arm 40 to share an axis of rotation but allows for relative rotation between the second end 44 and outer socket 30. The second end 44 is preferably cylindrical, and a slot 38 is disposed in the end of the fixed handle 20 to allow the second end 44 to rotate within the outer socket 30. The internal profile 32 of the outer socket 30 also has a second portion 36, which may be splined or otherwise allow for torque transmission.

Figure 7B:
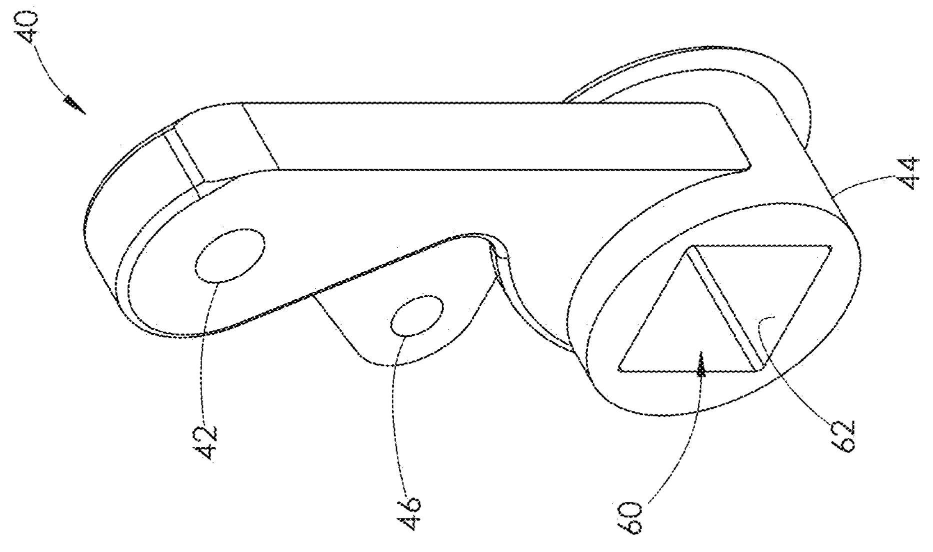
FIG. 7B is a perspective view thereof.
Figure 7A:
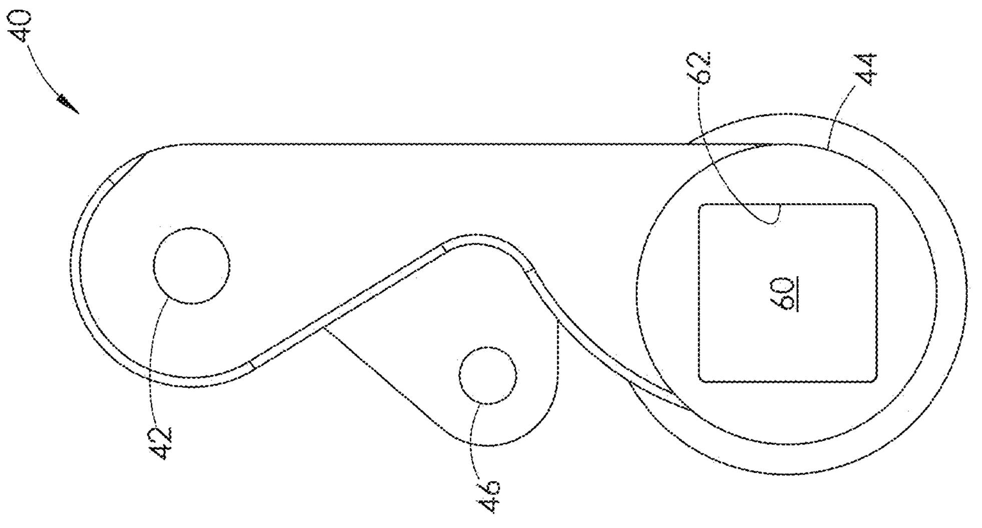
FIG. 7A is a side view of the rotational arm of the handle assembly with the inner socket shown.
Figure 8:
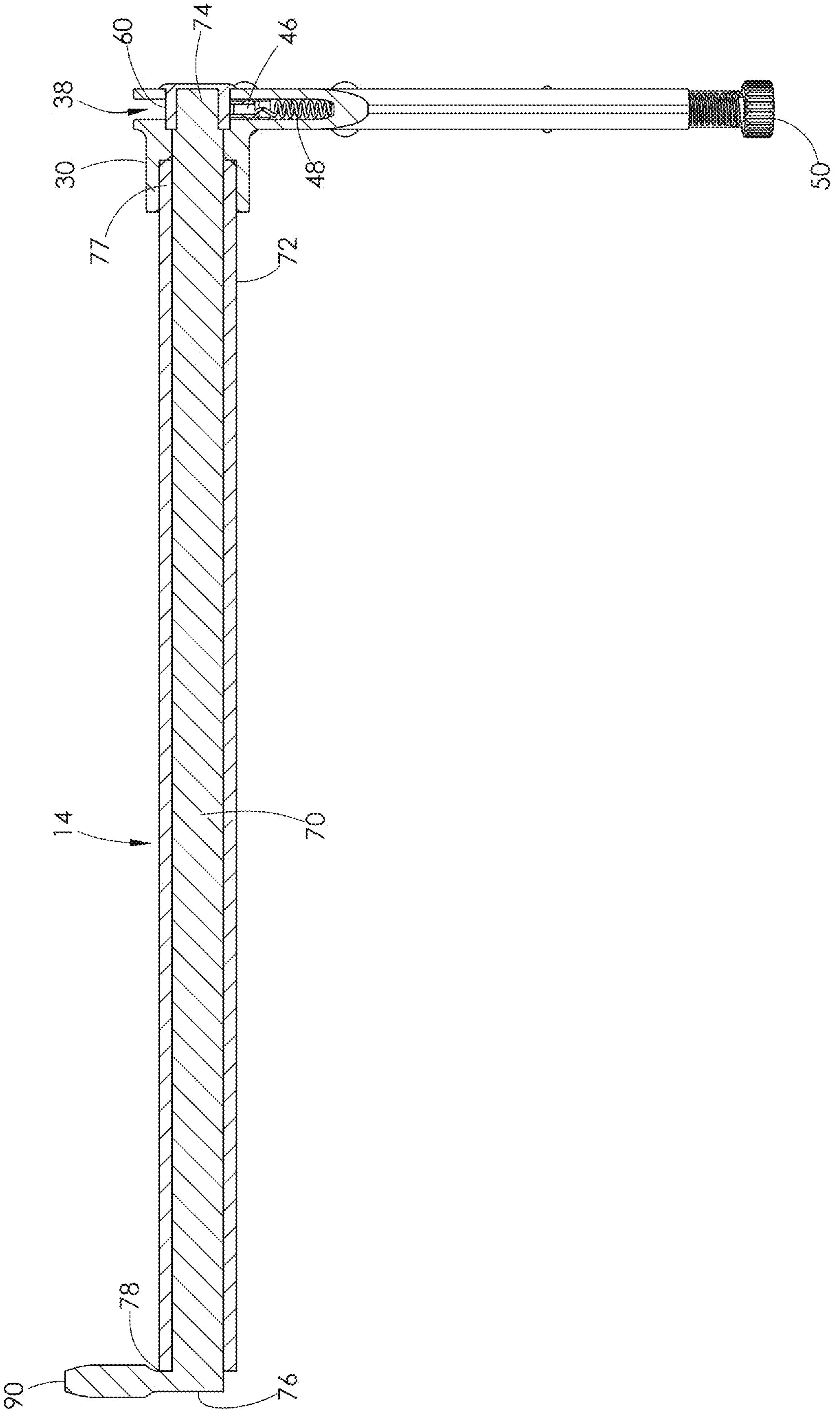
FIG. 8 is a sectional view of the made-up vise tool with the inner shaft within the inner socket and the outer shaft within the outer socket.

With reference to FIGS. 7A-7B, the rotational arm 40 further comprises a second arm pivot 46. The second arm pivot 46 is attached to a spring 48, as shown in FIG. 8. The spring 40 provides pressure on the rotational arm 40. This spring pressure is provided by an adjustable screw 50 disposed at an end of the fixed handle 20.

The rotational arm 40 further comprises inner socket 60 at its second end 44. As shown, the inner socket 60 has an internal profile 62 which is complementary to a rectangular prism, though other mechanisms such as splines may be used. The rotational arm 40 and adjustable screw 50 act in concert much like the jaws of a traditional vise grip or locking plier tool.

Rather than adjusting a pressure on an over-center mechanism for the jaws, directly, the tool 10 allows the adjustment of an over-center mechanism which determines a relative position between the second portion 36 of the outer socket 30 and the inner socket 60. When the pair of jaws 16 are locked, a release handle 52 may be actuated to overcome the over-center position of the locked jaws and allow the jaws to release.

Figure 9:
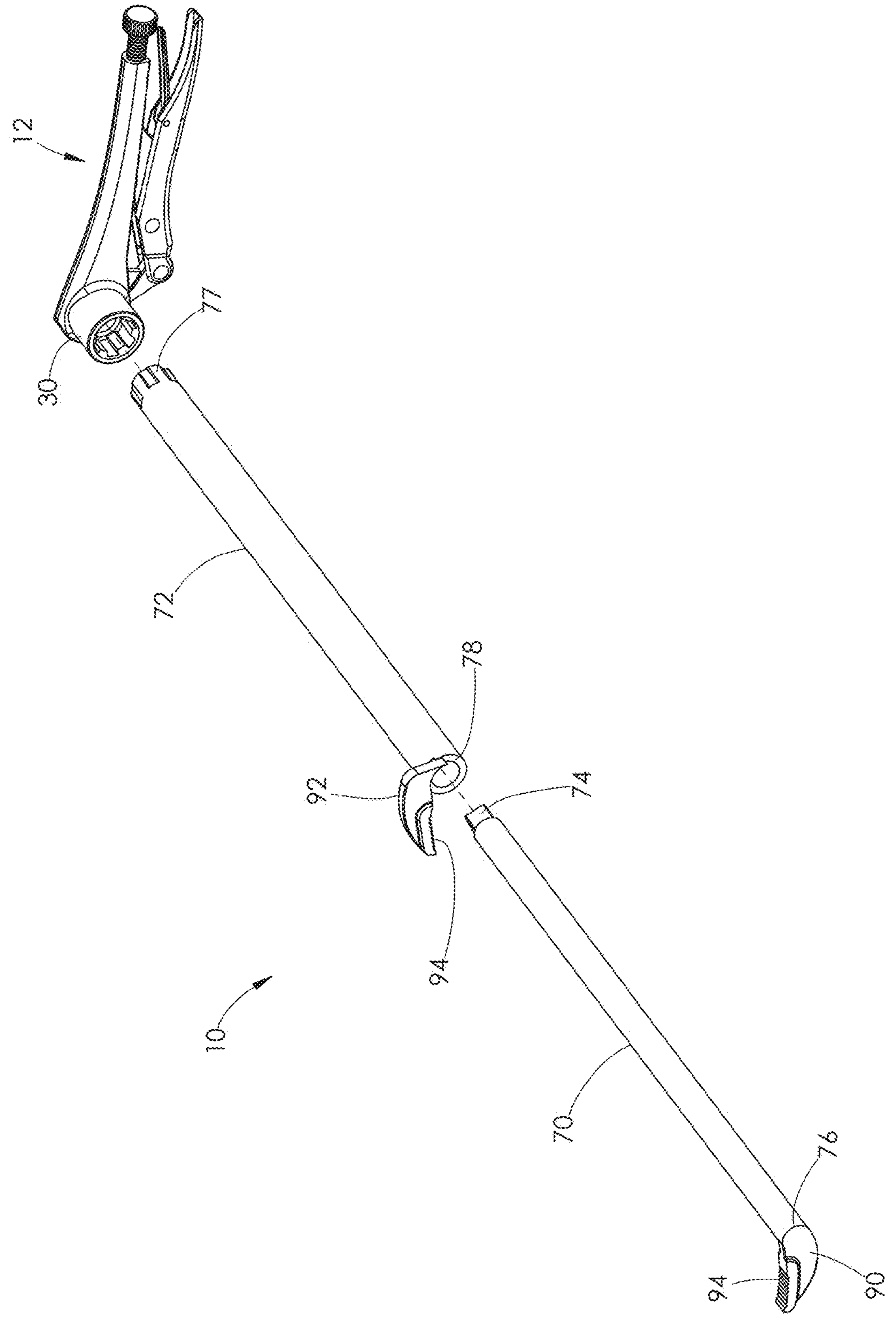
FIG. 9 is an exploded perspective view with the inner shaft, outer shaft, and socket of the handle assembly separated.

With reference to FIGS. 8 and 9, the offsetting shaft assembly 14 comprises an inner shaft 70 and an outer shaft 72. The inner shaft 70 extends from a first end 74 to a second end 76. The first end 74 has an outer profile which is complementary to profile 62 of the inner socket 60 of the vise handle 12. As shown, the first end 74 is a prism with a square cross-section. The second end 76 is fixedly attached to a first jaw 90 of the jaw assembly 16. The inner shaft 70 is shown as cylindrical between the first end 74 and the second end 76, but any shape which does not interfere with relative rotation of the inner shaft 70 and outer shaft 72 may be used without departing from the spirit of the invention.

The outer shaft 72 extends from a first end 77 to a second end 78. The first end 77 has a profile that is complementary to the second portion 36 of the first socket 30. As shown, the first end 77 includes a splined portion. The second end 78 is fixedly attached to a second jaw 92 of the jaw assembly 16. The second end 78 is open, allowing the inner shaft 70 to be placed within the outer shaft 72. When disposed within the outer shaft 72, the inner shaft 70 is situated such that the first jaw 90 and second jaw 92 are in opposition, with crush faces 94 in face-to-face orientation. The first ends 74, 77 are likewise both exposed and capable of connection to the corresponding sockets 60, 30.

Each crush face 94 may have a serrated surface in order to maximize friction between the jaw 90, 92 and an object being turned. In addition, it may have a slightly concave surface, similar to standard vise tools.

Figure 10:
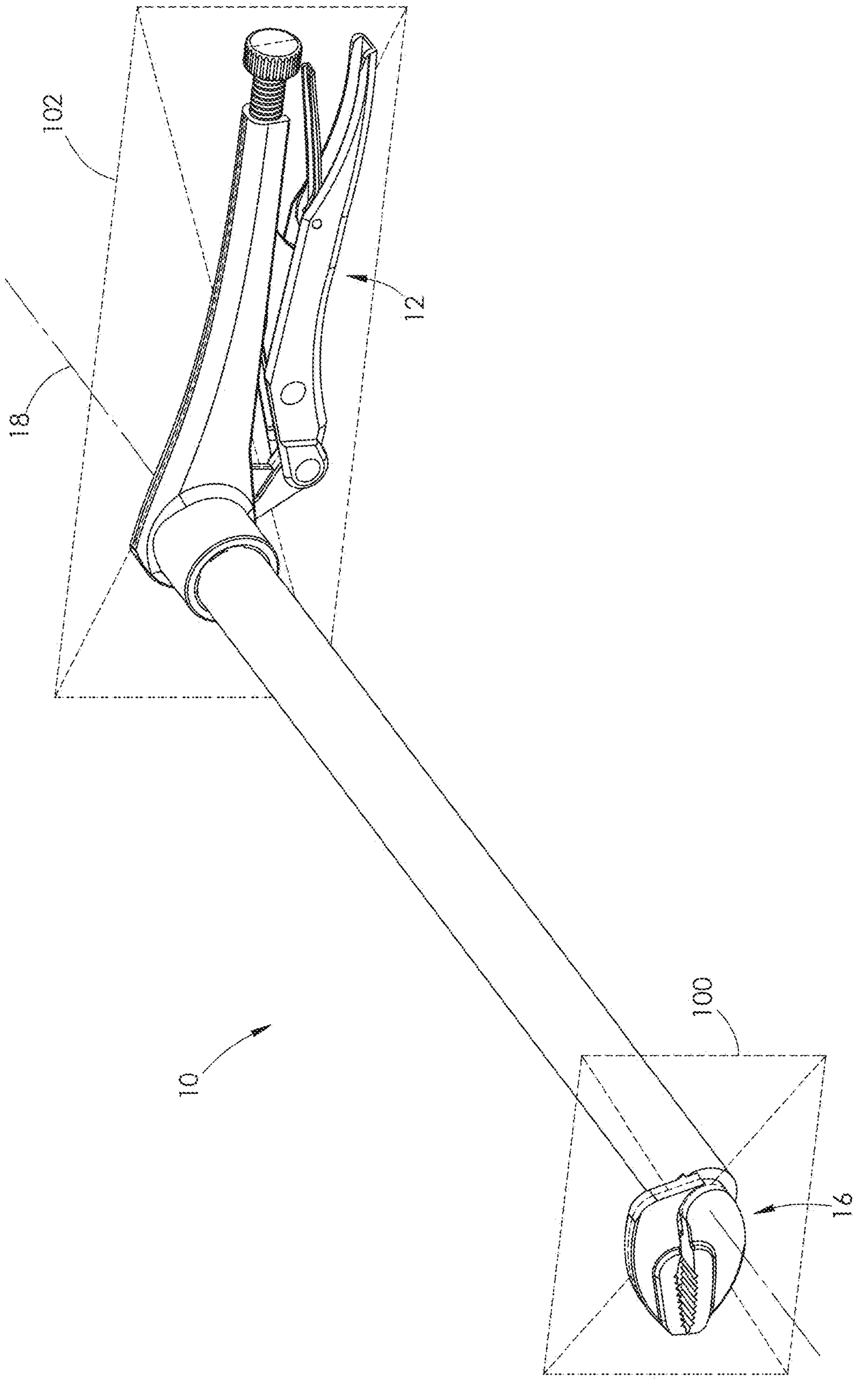
FIG. 10 is the view of FIG. 1 with parallel planes shown for each of the pair of jaws and the handle assembly.

In FIG. 10, the geometrical orientation of the vise tool 10 is shown. The first jaw 90 is connected to the inner shaft 70, and rotates within a first plane 100 about the axis 18. To actuate the first jaw 90, various components of the handle assembly 12 move about pivot points within a second plane 102. Due to the movement of the movable handle 22 and rotational arm 40 within the second plane 102, the inner socket 60 rotates relative to the outer socket 30 about axis 18. Once locked, the entire handle assembly 12 is then rotated, thereby rotating the now-locked inner 70 and outer 72 shafts, and therefore the pair of jaws 16 and anything between the crush faces 94.

Thus, the vise tool works in a similar manner to a pair of vise grips or jaw locking pliers. However, the handle 12 is in a first plane which is parallel to and separate from a second plane, which contains the jaws 16. Unlike t-shaped wrenches, the tool 10 can operate with a number of different bolt sizes. By keeping the overall structure of traditional jaw locking pliers the same, anyone familiar with such a tool can use the offset vise tool 10 to turn bolts which may be in difficult-to-reach positions, locking the jaws 16 onto bolts of various sizes (or even one of an unknown size) that are in spaces too small for the handle 12 or a person's hand.

Further, shafts 70, 72 of various sizes and orientations may be utilized with handle 12. For example, a different type of jaw assembly may be disposed at the end of an alternative shaft, or a length of the shafts 70, 72 may be longer or shorter, depending upon the application for which the tool 10 is used. Different jaws and crush faces may be better for certain bolts or structures to be turned. The handle assembly 12 is therefore preferably used with a plurality of different offsetting shaft assemblies 14, for turning various jaw assemblies 16.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A vise tool comprising:

a handle assembly comprising a first handle and a second handle movable relative to the first handle;

a jaw assembly comprising a pair of jaws including a first jaw having a first crush face, and a second jaw having a second crush face, wherein the first crush face and the second crush face are in opposition, the pair of jaws being adjustable between a closed and locked position and an open position;

an offsetting shaft assembly operatively connecting the handle assembly to the jaw assembly, the offsetting shaft assembly comprising:

an outer shaft attached to the first jaw; and an inner shaft disposed within and rotatable relative to the outer shaft and connected to the second jaw;

the offsetting shaft assembly defining an offset distance between a plane containing the handle assembly and a first plane containing the jaw assembly;

wherein the handle assembly is configured to open, close, and lock the pair of jaws, and the pair of jaws are configured to rotate in a second plane parallel to the first plane containing the handle assembly; and wherein the handle assembly further comprises a socket, the socket comprising an inner socket and an outer socket, wherein the inner socket is rotatable relative to the outer socket and wherein:

the inner shaft is connectable to the inner socket; and the outer shaft is connectable to the outer socket.

2. The vise tool of claim 1 in which the inner shaft comprises a first end complementary to a profile of the inner socket.

3. The vise tool of claim 1 in which the handle assembly further comprises a tension spring, in which the tension spring adjusts a position of the inner socket relative to the outer socket.

4. The vise tool of claim 1 in which the first jaw is fixedly attached to the outer shaft.

5. The vise tool of claim 1 in which the offset distance is greater than six inches.

6. A vise tool comprising:

a handle assembly comprising a socket, a first handle and a second handle, wherein the second handle is movable relative to the first handle;

a jaw assembly comprising a pair of jaws configured to grip and lock onto an object and rotate in a first plane; and an offsetting shaft assembly operatively connecting the handle assembly to the jaw assembly, the offsetting shaft assembly comprising:

an inner shaft configured to transmit rotation from the handle assembly to a first jaw of the pair of jaws; and an outer shaft configured to transmit rotation from the handle assembly to a second jaw of the pair of jaws;

the offsetting shaft assembly positioning the first plane parallel to and offset from a second plane, in which the second plane contains the handle assembly;

wherein the socket comprises an inner socket portion and an outer socket portion, wherein the inner socket portion is rotatable relative to the outer socket portion.

7. The vise tool of claim 6 in which the inner socket has a profile complementary to a rectangular prism.

8. The vise tool of claim 6 in which the inner socket is configured to rotate relative to the outer socket in response to relative rotation between the first handle and the second handle.

9. The vise tool of claim 6 wherein in which:

the inner shaft is disposed within the outer shaft and engaged with the inner socket;

the outer shaft is engaged with the outer socket; and the first jaw and the second jaw are opposed.

* * * * *